Aug. 29, 1967  A. STIHL ET AL  3,337,940
METHOD OF CONNECTING A DRUM TO A SPROCKET WHEEL
Filed July 29, 1964  2 Sheets-Sheet 1
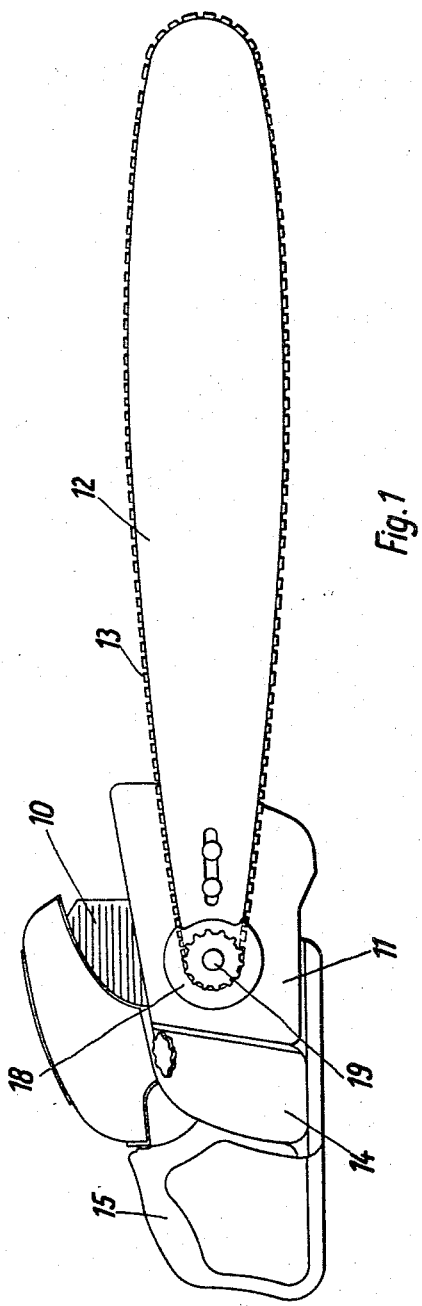
Inventor:
Andreas Stihl
Karl Gutjahr Aug. 29, 1967   A. STIHL ET AL   3,337,940
METHOD OF CONNECTING A DRUM TO A SPROCKET WHEEL
Filed July 29, 1964   2 Sheets-Sheet 2
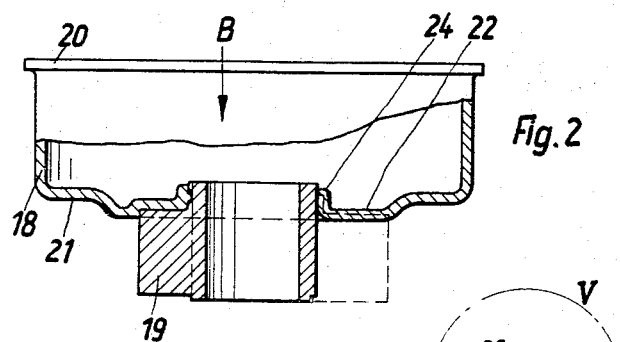
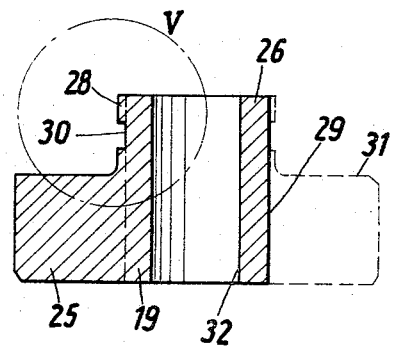
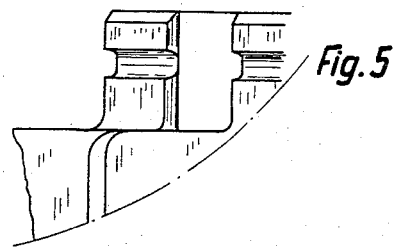
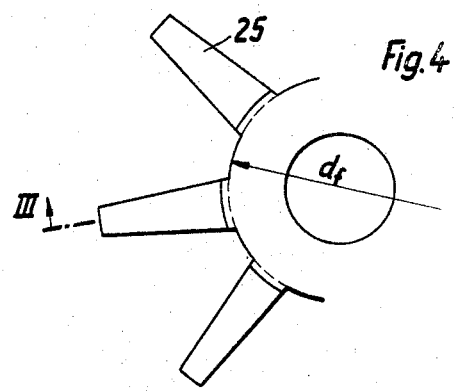
Inventor:
Andreas Stihl
Karl Gutjahr United States Patent Office 3,337,940
Patented Aug. 29, 1967

3,337,940
METHOD OF CONNECTING A DRUM TO A SPROCKET WHEEL
Andreas Stihl, Rohrbronn, and Karl Gutjahr, Wendlingen am Neckar, Germany, assignors to Andreas Stihl, Neustadt-Waiblingen, Germany
Filed July 29, 1964, Ser. No. 385,872
Claims priority, application Germany, July 30, 1963, St 20,921
4 Claims. (Cl. 29—159)

The present invention relates to a motor chain saw with a driving sprocket wheel which engages a saw chain moving over a guiding arm and is mounted on a clutch drum pertaining to a clutch interposed between the sprocket wheel and the driving motor and adapted either selectively or automatically to be engaged and disengaged. More specifically, the present invention relates to a method of connecting the above referred to clutch drum to the driving sprocket wheel.

With heretofore known motor chain saws, the clutch drum which is deep drawn from steel sheet metal has a collar extending into the interior of the drum, which collar surrounds the central bore of the drum and serves as engaging surface for the bearing neck of the sprocket wheel. This bearing neck is introduced into the collar from the outside and welded thereto. However, experience has proved that for the purpose of obtaining a permanent connection, such welding operations have to be carried out extremely careful and therefore are time consuming and expensive. Moreover, in view of the heat inherent to a welding operation, the strengthening of the drum surface which is obtained during the pressing or drawing operation is lost again to a major extent. Finally, as a result of the welding operation, heat tensions may develop due to which the drum surface may be out of line with regard to the axes of the bore of the driving sprocket wheel.

It is, therefore, an object of the present invention to overcome the above mentioned drawbacks.

It is another object of this invention to provide an inexpensive, quick and reliable method of connecting the clutch drum with the driving sprocket wheel for a motor chain saw.

These and other objects and advantages of the invention will appear more clearly from the following specification in connection with the accompanying drawings, in which:

FIG. 1 diagrammatically illustrates a chain saw equipped with a clutch-sprocket wheel connection effected according to the present invention.

FIG. 2 illustrates partly in section and partly in view a clutch drum connected to the driving sprocket wheel of a motor chain saw in conformity with the present invention.

FIG. 3 illustrates in section and on a somewhat larger scale than FIG. 2 the sprocket wheel by itself; FIG. 3 representing a section taken along the line III—III of FIG. 4.

FIG. 4 is an axial top view of the hub of the sprocket wheel of FIG. 3.

FIG. 5 illustrates in view that portion of FIG. 3 which is located within the dot-dash line circle V, but on a larger scale than that of FIG. 3.

The present invention is characterized primarily in that the clutch drum is by upset riveting connected to a hub formed on the driving sprocket wheel. When the clutch drum has an inwardly extending collar with a central bore as is known per se in connection with the above-mentioned welded arrangements, it is advantageous in conformity with the present invention to provide an annular groove on the hub formed on said sprocket wheel, said groove being located near that end section of the hub which extends into the interior of the drum. It is into this annular groove that the collar of the drum is pressed by the upset riveting which reduces the axial length of said collar. A particularly strong and firm connection between the clutch drum and the driving sprocket wheel is obtained when the hub of the sprocket wheel has axis-parallel flat grooves spaced from each other and located at that section of the drum which receives the collar. Advantageously, the sprocket wheel is produced from a longitudinal section of a profiled bar containing the teeth of the wheel. This longitudinal section is at one end thereof, for purposes of forming the hub, turned or machined off to such an extent that the outer hub diameter will be slightly greater than the diameter of the dedendum line of the sprocket wheel. The above-mentioned flat grooves between which a flat back remains as a residual portion of the turned off teeth, will then with less pressing force engage the wall of the bore of the collar than the flat ribs remaining therebetween.

Referring now to the drawings in detail, the motor chain saw shown therein is driven by a one cylinder two-cycle internal combustion engine 10 of for instance 50 cubic centimeter stroke volume. This engine has a crankcase 11 to which is connected a guiding arm 12 for a saw chain 13. The motor chain saw is furthermore equipped with a fuel tank 14 behind which there is arranged a handle 15 connected to the crankcase 11 and serving for guiding the motor chain saw.

The driving force of motor 10 is conveyed to saw chain 13 by an automatic centrifugal clutch which is coaxial to the motor crankshaft (not shown). According to the present invention, the said centrifugal clutch has its outer clutch drum 18 rotatably connected to a driving sprocket wheel 19 for the saw chain 13. This connection may be effected in any convenient manner, for instance by upset riveting. Clutch drum 18 is deep drawn from a two millimeter strong steel sheet-metal and has an upwardly flanged reinforcing rim 20 as seen in FIG. 2. The clutch drum has two annular zones offset with regard to each other, namely an outer annular zone 21 and an inner annular zone 22. The clutch drum furthermore comprises a central collar 24 which extends into the interior of the drum and serves for connecting the drum to the driving sprocket wheel 19. The sprocket wheel 19 is produced from a longitudinal section of a profiled bar which has seven radially extending longitudinal ribs which will result in the teeth 25 of the sprocket wheel. For purposes of forming a hub 26 adapted to be driven into collar 24 of the clutch drum, the said ribs are turned or machined off to such an extent that only very flat wedge portions or extensions 28 remain which protrude beyond the groove bottom 29 between the individual teeth 25. Furthermore, an annular groove 30 is cut into the circumference of hub 26.

For purposes of connecting the clutch drum 18 to the driving sprocket wheel 19, the latter has its hub 26 driven into collar 24 of drum 18. During this operation, the extensions 28 representing the residual section of the teeth or ribs 25 will be pressed into the wall of the bore of collar 24 so that a positive connection is established between drum 18 and sprocket wheel 19. Thereupon, by means of a suitable tubular punch, the end face of collar 24 is subjected to a considerable upsetting pressure in the direction of the arrow B of FIG. 2. This pressure drives the marginal zone of collar 24 into the annular groove 30 while at the same time the axial length of collar 24 is reduced. As will be evident from the left-hand portion of FIG. 2, during the upsetting operation the end faces 31 of the teeth of the sprocket wheel 19 are pressed into the wall of the inner annular zone 22 of clutch drum 18 so that the end faces of the teeth 25 are positively held in the wall of the clutch drum. In this way, an inexpensive connection is established between clutch drum 18 and sprocket wheel 19. The particular advantage of this connection consists in that the clutch drum 18 will engage those end faces 31 of teeth 25 which are adjacent said hub 26 so that the clutch drum 18 will occupy a precisely perpendicular position with regard to the axis of bore 32 in sprocket wheel 19. This will assure a true wobble-free running of the clutch drum and the sprocket wheel 19 when bore 32 of sprocket wheel 19 is employed for journalling the sprocket wheel on a stud not shown in the drawings.

It is, of course, to be understood that the present invention is, by no means, limited to the particular arrangement shown in the drawings but also comprises any modifications within the scope of the appended claims.

What is claimed is:

1. The method of mounting a drum on a sprocket wheel which comprises: turning a hub region on the end of a length of stock profiled to provide the teeth of the sprocket wheel so that at least the base portions of the teeth project from the hub, forming an axial flange about the central aperture of the drum to a diameter slightly less than the outside diameter of the tooth portions on the hub, pressing the drum on the hub with the axial flange engaging said tooth portions, and upsetting the flange to fix the drum to the hub.

2. A method according to claim 1 which includes forming an annular groove in the hub within the range of said flange whereby the upsetting of said flange will cause the flange to be displaced into said groove.

3. A method according to claim 2 which includes forming the sprocket wheel teeth at the ends adjacent the hub so as to be co-planar and radial and forming an annular region on the drum surrounding the central aperture thereof, and pressing said annular region against said ends of the teeth while effecting said upsetting to fixedly orient the axis of the drum relative to the axis of the sprocket wheel and hub.

4. A method of connecting a drum having an end face wall with a central bore therethrough to a sprocket wheel with teeth circumferentially spaced from each other, which includes the steps of: forming a hub at one end of said sprocket wheel and providing said hub with annular groove means, providing said end face wall adjacent said central bore thereof with an annular collar having an inner diameter approximately equalling the outer diameter of said hub, placing said collar on said hub, pressing said end face wall in axial direction of said hub between said teeth by a distance which is considerably less than the extension of said teeth in said axial direction so as to permit said teeth to function as sprocket wheel teeth, and upsetting said collar into gripping relation with said groove means.

References Cited

UNITED STATES PATENTS

| | | | |
|---|---|---|---|
| 2,127,969 | 8/1938 | Dingwerth | 29—520 |
| 2,429,293 | 10/1947 | Peck et al. | 29—148.4 |
| 3,105,709 | 10/1963 | Hanke | 29—159 X |

JOHN F. CAMPBELL, *Primary Examiner.*

THOMAS H. EAGER, DAVID J. WILLIAMOWSKY, *Examiners.*

J. A. WONG, *Assistant Examiner.*